I. N. TOPLIFF.
Carriage-Bow.
No. 9,026. Reissued Jan. 6, 1880.
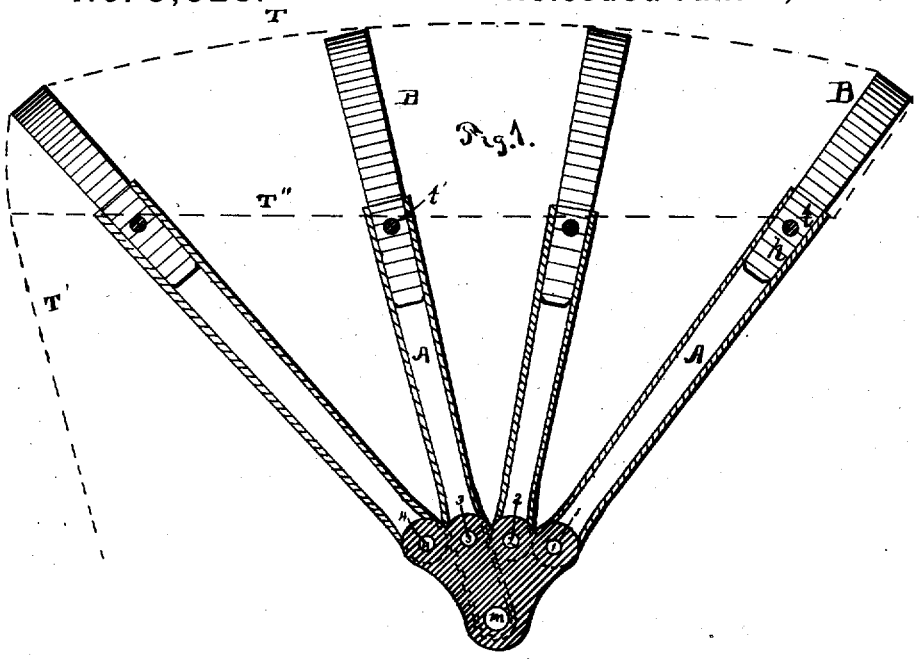
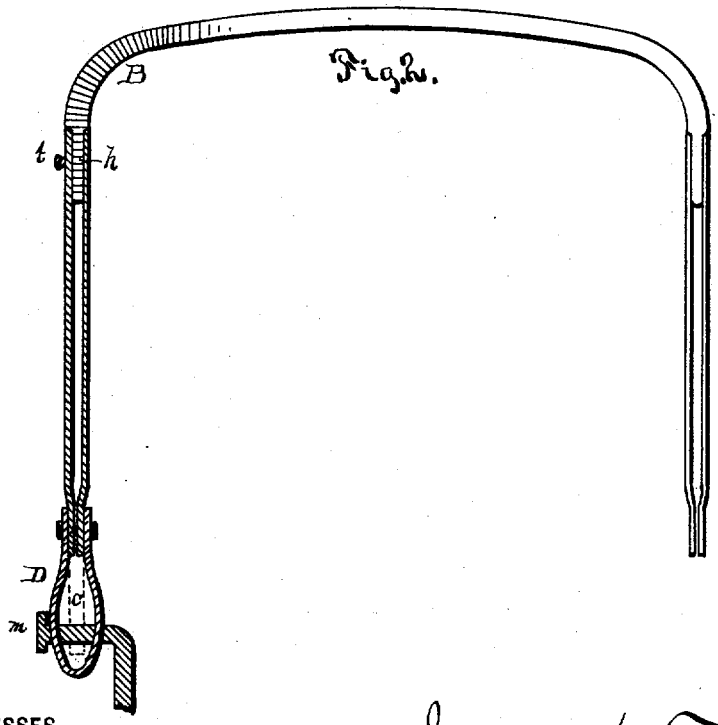
WITNESSES
Frank M. Halsey
Willard Fracker
INVENTOR
Isaac N. Topliff
By Leggett & Leggett ATTORNEYS
N. PETERS, PHOTO-LITHOGRAPHER, WASHINGTON, D. C.

UNITED STATES PATENT OFFICE.

ISAAC N. TOPLIFF, OF ELYRIA, OHIO.

CARRIAGE-BOW.

SPECIFICATION forming part of Reissued Letters Patent No. 9,026, dated January 6, 1880.

Original No. 110,513, dated December 27, 1870. Application for Reissue filed October 18, 1879.

*To all whom it may concern:*

Be it known that I, ISAAC N. TOPLIFF, of Elyria, in the county of Loraine and State of Ohio, have invented certain new and useful Improvements in Carriage-Bows; and I do hereby declare the following to be a full, clear, and exact description of the invention, such as will enable others skilled in the art to which it pertains to make and use it, reference being had to the accompanying drawings, which form part of this specification.

My invention relates to carriage-bows; and it consists in a bow of the character and construction hereinafter specified and claimed.

In the drawings, Figure 1 is a side elevation of the several bows of a carriage-top constructed according to my invention. Fig. 2 is a view in longitudinal section of one of the bows A and its socket D.

A A are the upright or straight portions of the carriage-bow; B, the upper bent and horizontal portions of said bow.

The parts A B, when united substantially as shown in Fig. 2 of the drawings, form a carriage-bow in three parts. The side or upright portions, A A, I make tubular. Into the upper end of the tubular portion A is inserted the top section, B. The lower or terminal portion of the tube A is suitably formed for attachment to the carriage-seat or bow-socket D.

The bow-socket D consists of two concave portions with their edges united and their concave sides facing each other. Within the cavity between said concave pieces the tubes A A are inserted and secured.

By constructing the carriage-bows with tubular sides or upright portions A A, I can produce an article possessing the qualities of cheapness, beauty, strength, and durability.

Moreover, when, from any reason, any tubular portion A should become worn or damaged, it can readily be replaced without material disturbance of the carriage-top structure.

I prefer constructing the portions A A from metal.

Believing myself to be the original inventor of a carriage-bow having tubular side portions A A, I claim, broadly—

1. A carriage-bow the side or upright portions, A A, of which are tubular, substantially as and for the purpose shown.

2. A carriage-bow consisting of the bent wooden section B and the tubular sections A A, the latter constituting the vertical sides or arms of the bow, the opposite ends of the bent portion B being secured to the upper ends of the tubular sections A A, substantially as set forth.

3. A carriage-bow consisting of the bent wooden section B and the metallic tubular sections A A, the latter constituting the straight or vertical sides of the bow, substantially as set forth.

4. A carriage-bow consisting of the bent wooden section B and the tubular sections A A, the latter constituting the straight or vertical sides of the bow, and constructed at their lower ends to be attached to a socket or carriage-seat, substantially as set forth.

In testimony whereof I have hereunto set my hand in the presence of two witnesses.

ISAAC N. TOPLIFF.

Witnesses:
R. W. POMROY,
A. R. WEBBER.